United States Patent [19]

Araki et al.

[11] Patent Number: 5,548,801
[45] Date of Patent: Aug. 20, 1996

[54] SYSTEM FOR DETERMINING AND REGISTERING LOCATION OF MOBILE TERMINAL FOR COMMUNICATION SYSTEM WITH NON-GEOSYNCHRONOUS SATELLITES

[75] Inventors: Noriyuki Araki, Ohmiya; Hideyuki Shinonaga, Hanno; Yasuhiko Itoh, Tokyo, all of Japan

[73] Assignee: Kokusai Denshin Denwa Kabushiki Kaisha, Tokyo, Japan

[21] Appl. No.: 189,891

[22] Filed: Feb. 1, 1994

[30] Foreign Application Priority Data

Feb. 10, 1993 [JP] Japan ................................. 5-044390
Feb. 10, 1993 [JP] Japan ................................. 5-044391

[51] Int. Cl.$^6$ ............................................... H04B 7/185
[52] U.S. Cl. ..................... 455/13.1; 455/13.2; 455/33.1; 455/56.1; 379/60; 342/357
[58] Field of Search ............................. 455/12.1, 13.1, 455/13.2, 13.3, 25, 33.3, 33.1, 56.1; 342/357; 340/988; 379/60

[56] References Cited

U.S. PATENT DOCUMENTS

| | | | |
|---|---|---|---|
| 3,384,891 | 5/1968 | Anderson | 455/13.1 |
| 4,644,347 | 2/1987 | Lucas et al. | 455/56.1 |
| 5,043,736 | 8/1991 | Darnell et al. | 342/357 |
| 5,111,209 | 5/1992 | Toriyama | 342/357 |
| 5,303,286 | 4/1994 | Wiedeman | 455/13.1 |
| 5,307,277 | 4/1994 | Hirano | 342/357 |
| 5,313,215 | 5/1994 | Walker et al. | 455/12.1 |
| 5,343,512 | 8/1994 | Wang et al. | 340/988 |
| 5,408,237 | 4/1995 | Patterson et al. | 455/12.1 |

FOREIGN PATENT DOCUMENTS

3-240322  10/1991  Japan ................................. 455/13.3

*Primary Examiner*—Reinhard J. Eisenzopf
*Assistant Examiner*—Andrew Faile
*Attorney, Agent, or Firm*—Emmanuel J. Lobato

[57] ABSTRACT

A system for determining and registering the location of mobile terminals in a mobile communication system using non-geosynchrous satellites, in which each land earth station transmits its identification information via spot beams of satellites or together with identification information of a spot beam and that of satellite. A mobile terminal thus receives identification information, and transmits the received identification information together with information on time of reception and the terminal identifying information to the terrestrial network for registering the latest location information. Since the latest location information of mobile terminal is registered in the terrestrial network as mentioned above, a call can be connected to the mobile terminal simply by sending a call announcement message by referring the registered location information. This leads to reduction of the number of circuits that are needed for sending call announcement messages.

7 Claims, 9 Drawing Sheets

SYSTEM FOR DETERMINING AND REGISTERING LOCATION OF MOBILE TERMINAL FOR COMMUNICATION SYSTEM WITH NON-GEOSYNCHRONOUS SATELLITES

BACKGROUND OF THE INVENTION

The present invention relates to communication systems using non-geosynchronous satellites and, more particularly, to a system which determines and registers the location of a mobile terminal.

Figure 9:
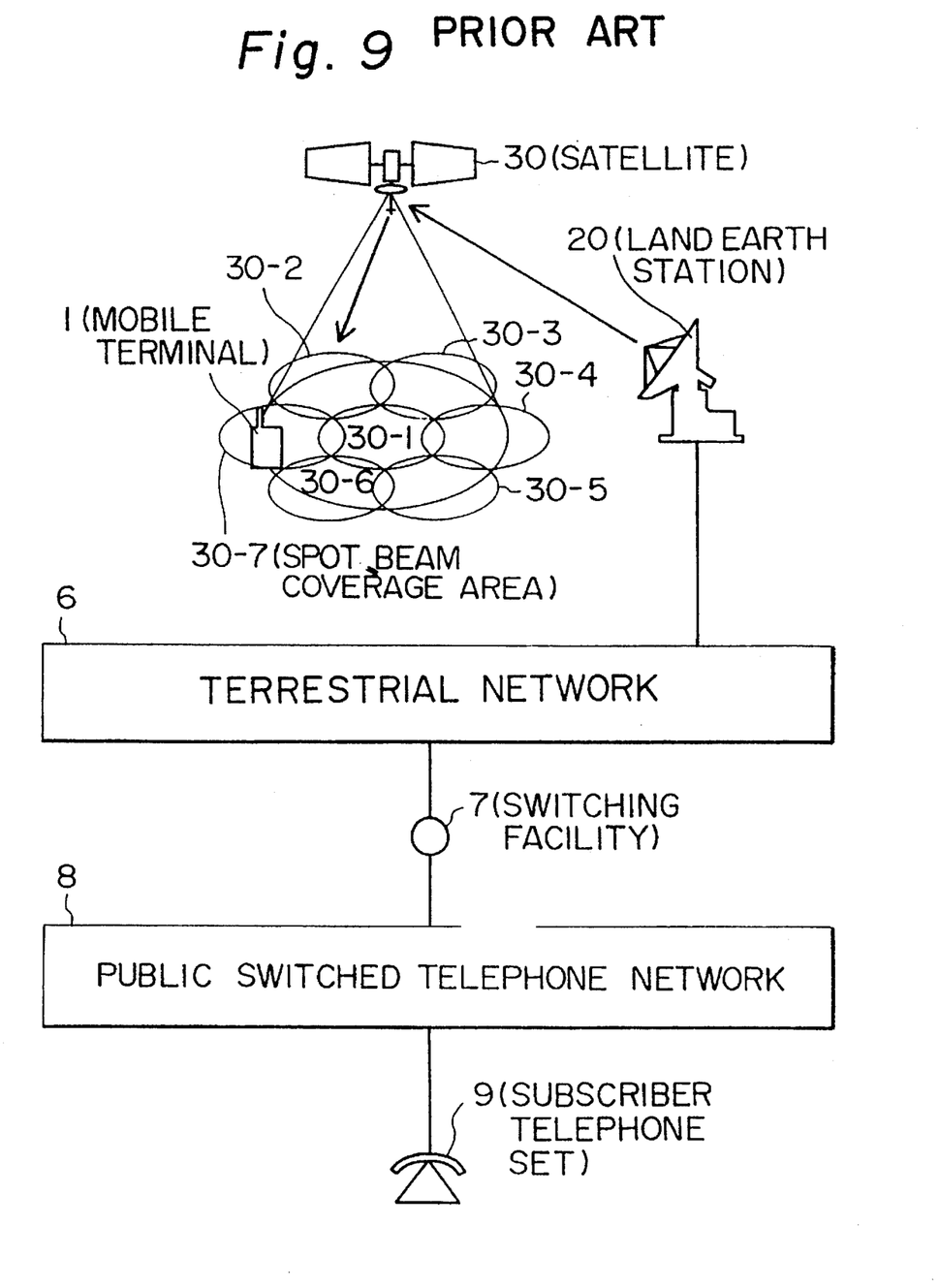
FIG. 9 is a diagram of a conventional mobile satellite communication system using a multi-spot-beam satellite.

In a mobile satellite communication system using satellites, a mobile terminal communicates via the satellites and land earth stations. FIG. 9 conceptually shows a mobile terminal, a land earth station and a satellite. In FIG. 9, reference numeral 1 denotes a mobile terminal, 20 a land earth station, 30 a communications satellite (hereinafter referred to simply as a satellite) capable of communicating with the mobile terminal 1 and the land earth station 20, 30-1 through 30-7 spot beam coverage areas wherein the satellite 30 is capable of communicating with mobile terminals, 6 is a terrestrial network which has at least one land earth station, 7 is a switching facility, 8 a public switched telecommunication network, and 9 is a subscriber telephone set. In a mobile telecommunication system using satellites, a mobile terminal is allowed to originate a call as long as it is at a place where at least one satellite used in the satellite communication system is seen. In a case where a call for a mobile terminal is originated, however, it is necessary to send a call announcement message to the desired mobile terminal to connect the call. The International Maritime Satellite Organization standard A system, which is a mobile satellite communication system now in service, employs a total of four geosynchronous satellites covering the Indian Ocean Region, the West Atlantic Ocean Region, the East Atlantic Ocean Region and the Pacific Ocean Region, respectively. Each satellite irradiates a global beam to cover its responsible Region to communicate with mobile terminals. To send a call announcement message to the called mobile terminal, the INMARSAT standard A system uses a method which specifies or designates the Ocean Region where the mobile terminal is assumed to be located, by the corresponding number in front of the terminal number.

With such a method, however, if the desired mobile terminal is not located in the specified Ocean Region, the calling party will have to dial again specifying another Ocean Region or initiating a call. In the case of employing this method in a telecommunication system with a large number of mobile terminals, the smaller the number of regions that the calling party specifies by dialing, the larger the number of circuits that must be prepared for sending call announcement messages in each area. Moreover, the larger the number of regions, the more times of dialing may be required for the calling party reach the desired mobile terminal. It is desired, therefore, to implement a method in which the calling party only has to dial the terminal number and the right region is automatically selected. This requires location information of all the mobile terminals in use. In a mobile communication system using geostationary satellites having a plurality of spot beams, the area wherein a mobile terminal is allowed to communicate with the satellite does not move with respect to the earth, and hence the spot beam coverage area wherein the mobile terminal is located can be used intact as location information. In a communication system using non-geosynchronous satellites, however, the area wherein a mobile terminal is capable of communicating with the satellite changes every moment, and hence the spot beam coverage area cannot be used as location information.

SUMMARY OF THE INVENTION

An object of the present invention is to provide a system for readily and efficiently determining and registering the location of mobile terminals in a mobile communication system using non-geosynchrous satellites.

To attain the above object, according to the present invention, each land earth station transmits its identification information via spot beams of satellites or together with identification information of a spot beam and that of a satellite. A mobile terminal thus receives identification information, and transmits the received identification information together with information on time of reception and the terminal identifying information to the terrestrial network for registering the latest location information.

According to the present invention, since the latest location information of a mobile terminal is registered in the terrestrial network as mentioned above, a call can be connected to the mobile terminal simply by sending a call announcement message by referring the registered location information. This leads to reduction of the number of circuits that are needed for sending call announcement messages.

BRIEF DESCRIPTION OF THE DRAWINGS

The present invention will be described in detail below with reference to accompanying drawings, in which.

DETAILED DESCRIPTION

Embodiment 1

A first embodiment of the present invention will be described with reference to FIGS. 1 through 3.

In this embodiment, a plurality of multi-spot-beam non-geosynchronous satellites are arranged so that mobile terminal and a land earth station are allowed to communicate with through at least one of the satellites at all times. The non-geosynchronous satellites and their spot beams are respectively assigned unique identification codes and each satellite always transmits the satellite identification code and the spot beam identification code via corresponding spot beam. The mobile terminal receives, at predetermined time intervals, the spot beam and satellite identification codes from the satellite with which the mobile terminal is allowed to communicate, the spot beam and satellite identification codes thus received by the mobile terminal being transmitted to the terrestrial network.

Figure 1:
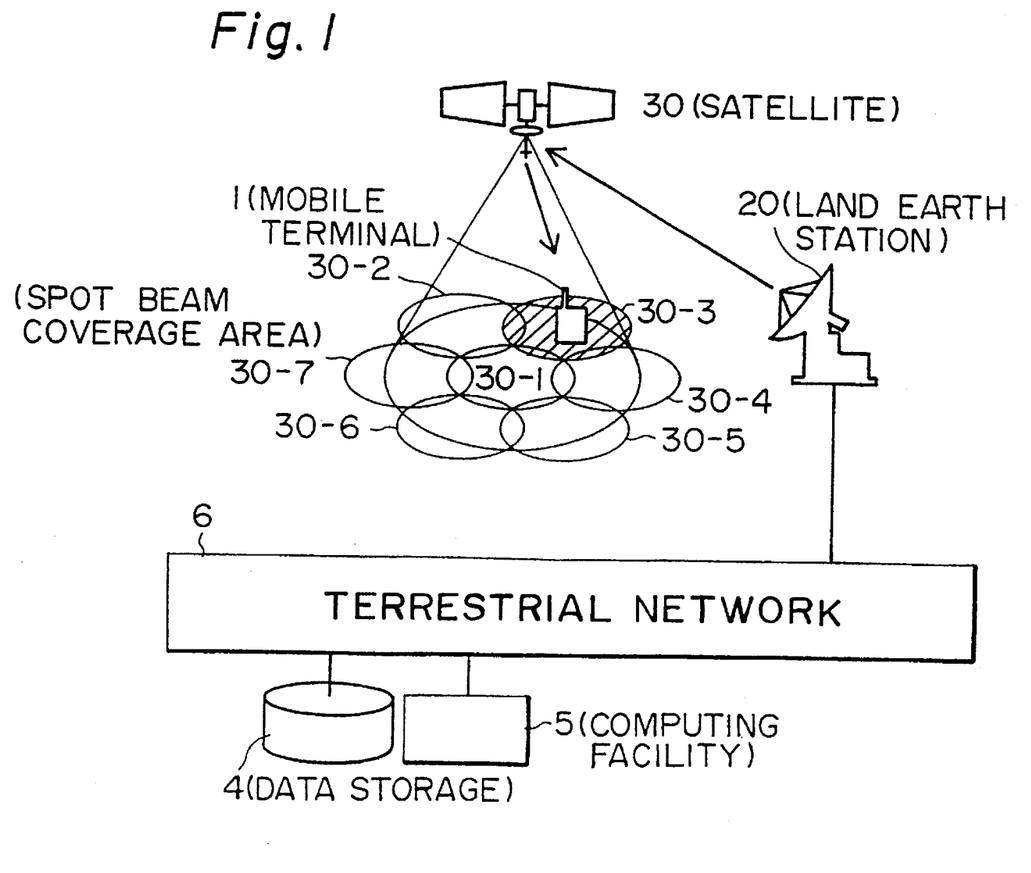
FIG. 1 is a diagram explanatory of how the location of mobile terminal is determined using information identification a non geosynchrous satellite and its spot beam.

FIG. 1 conceptually shows the positional relationships of a mobile terminal, a satellite and a land earth station at a certain moment of time, t, in the location determining and registering method according to the present invention. In FIG. 1, reference numeral 1 denotes a mobile terminal, 20 a land earth station, 30 a non-geosynchronous satellite, 30-1, 30-2, 30-3, 30-4, 30-5, 30-6 and 30-7 spot beam coverage areas of the circum-satellite 30, 4 is a data storage, 5 is a computing facility, and 6 is the terrestrial network of the circumglobal satellite communication system. Supposing that the mobile terminal assumes such a position as shown in FIG. 1 relative to the satellite and the land earth station, the mobile terminal 1 receives the identification code SID30-3 of the spot beam 30-3 of the satellite 30. The mobile terminal 1 transmits the identification code SID30-3 and its reception time t to the terrestrial network 6 via the satellite 30 and the land earth station 20, together with the terminal identification code TID1 of the mobile terminal 1. The terrestrial network 6 sends to the computing facility 5 the information thus transmitted from the mobile terminal 1. The computing facility 5 is always computing the orbiting schedule of each satellite, and hence is capable of calculating the area 30-3 irradiated by the spot beam corresponding to the identification code SID30-3 at the time t when it was transmitted from the mobile terminal 1. Furthermore, the computing facility 5 calculates the area where the mobile terminal 1 is assumed to be located, on the basis of the spot beam coverage area 30-3 calculated as mentioned above.

Figure 2:
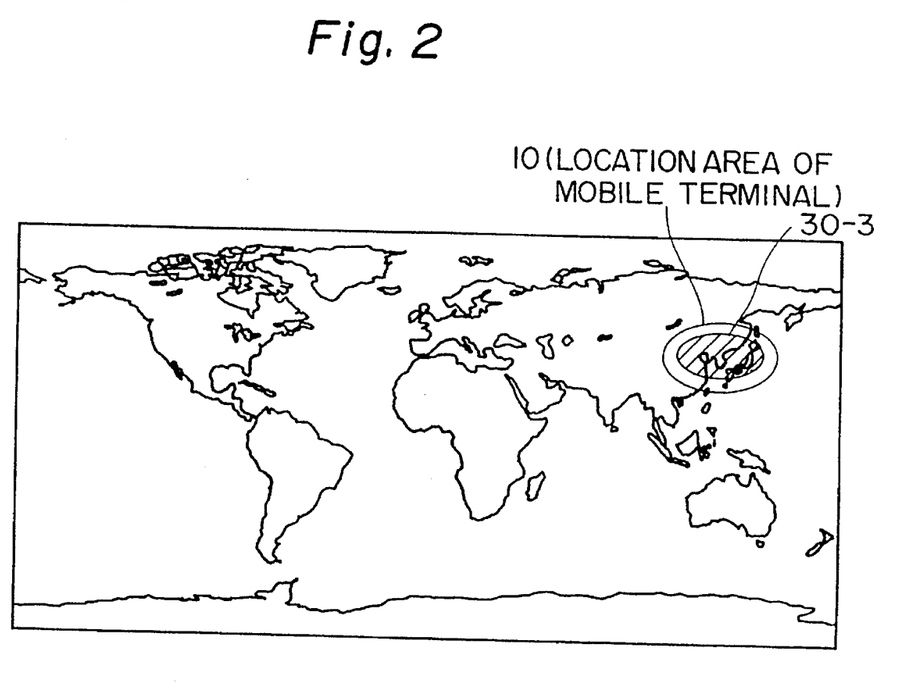
FIG. 2 is a diagram showing a spot beam coverage area and an area of location of mobile terminal calculated by the terrestrial network in case of registering the position of the mobile terminal through the use of the satellite and spot beam identifying information.

FIG. 2 shows the positional relationship between the spot beam coverage area irradiated by the corresponding spot beam of the satellite 30 at the time when the mobile terminal 1 received its spot beam identification number and the area where the mobile terminal 1 is assumed to be calculated by the computing facility 5 on the basis of the spot beam coverage area 30-3. In FIG. 2, reference numeral 10 denotes the area where the mobile terminal 1 is assumed to be calculated by the computing facility 5. The computing facility 5 calculates the area 10 a little wider than the reported spot beam coverage area 30-3, as the location information of the mobile terminal 1, taking into account the movement of the mobile terminal in the predetermined time interval during which its position is detected and the offset of the satellite from its orbit. The terrestrial network 6 registers the area 10 calculated by the computing facility 5 as the latest location information of the mobile terminal 1 in the data storage 4. Thereafter, when a call for the mobile terminal 1 is originated, the land earth stations, the satellites and the spot beams are selected properly to send a call announcement message to the mobile terminal 1 in the registered area 10.

Figure 3:
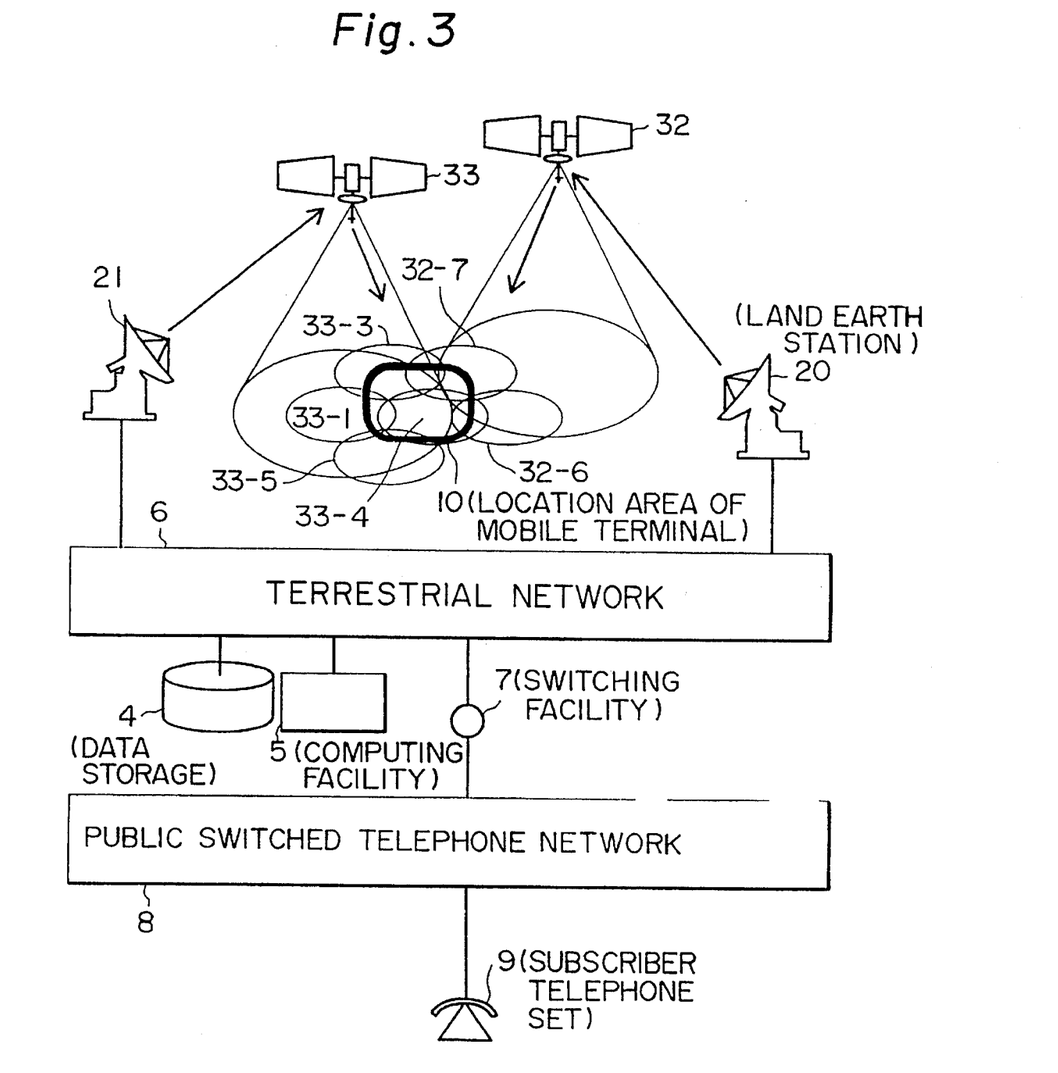
FIG. 3 is a diagram explanatory of how mobile terminal is called in a case where its location has been registered using satellite and spot beam identifying information.

FIG. 3 conceptually shows how a call originated from a subscriber telephone set is connected to the mobile terminal 1. In FIG. 3, reference numeral 21 denotes a land earth station, 32 and 33 non-geosynchronous satellites, 32-6, 32-7, 33-1 and 33-3 through 33-7 spot beam coverage areas of the satellites 32 and 33, 7 a switching facilities, 8 the public switched telephone network, and 9 a subscriber telephone set. Whenever a call is made for the mobile terminal 1, the data storage 4 is referred to, because it has stored therein the positional information of the mobile terminal 1. The location information 10 registered in the data storage 4 is referred to and sent to the computing facilities 5. The computing facilities 5 selects the land earth stations, the satellites and their spot beams necessary for sending a call announcement message to the area 10. In such a case as shown in FIG. 3, the land earth stations 20 and 21, spot beams corresponding to the spot beam coverage areas 32-6 and 32-7 of the satellite 32 and spot beams corresponding to the spot beam coverage areas 31-1 and 33-3 through 33-5 of the satellite 33 are selected and used to transmit the call announcement message to the area 10.

Embodiment 2

Figure 4:
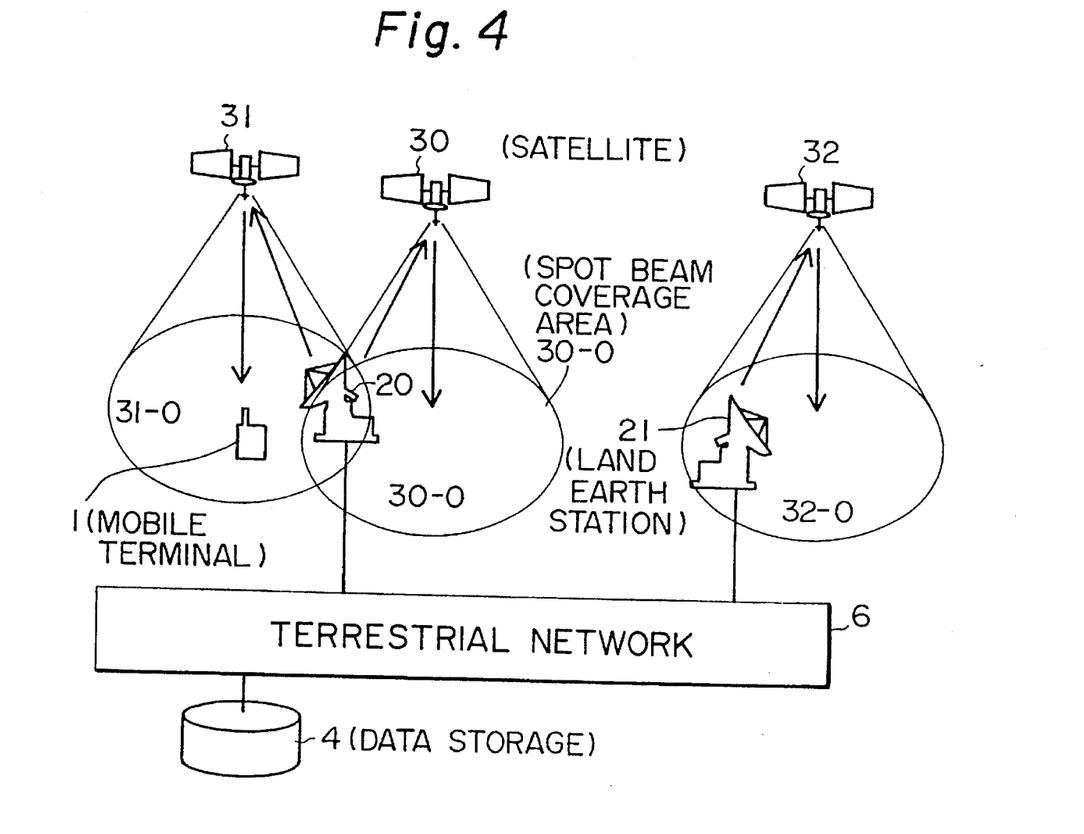
FIG. 4 is a diagram explanatory of how the location of mobile terminal is registered using identification information of a land earth station.
Figure 5:
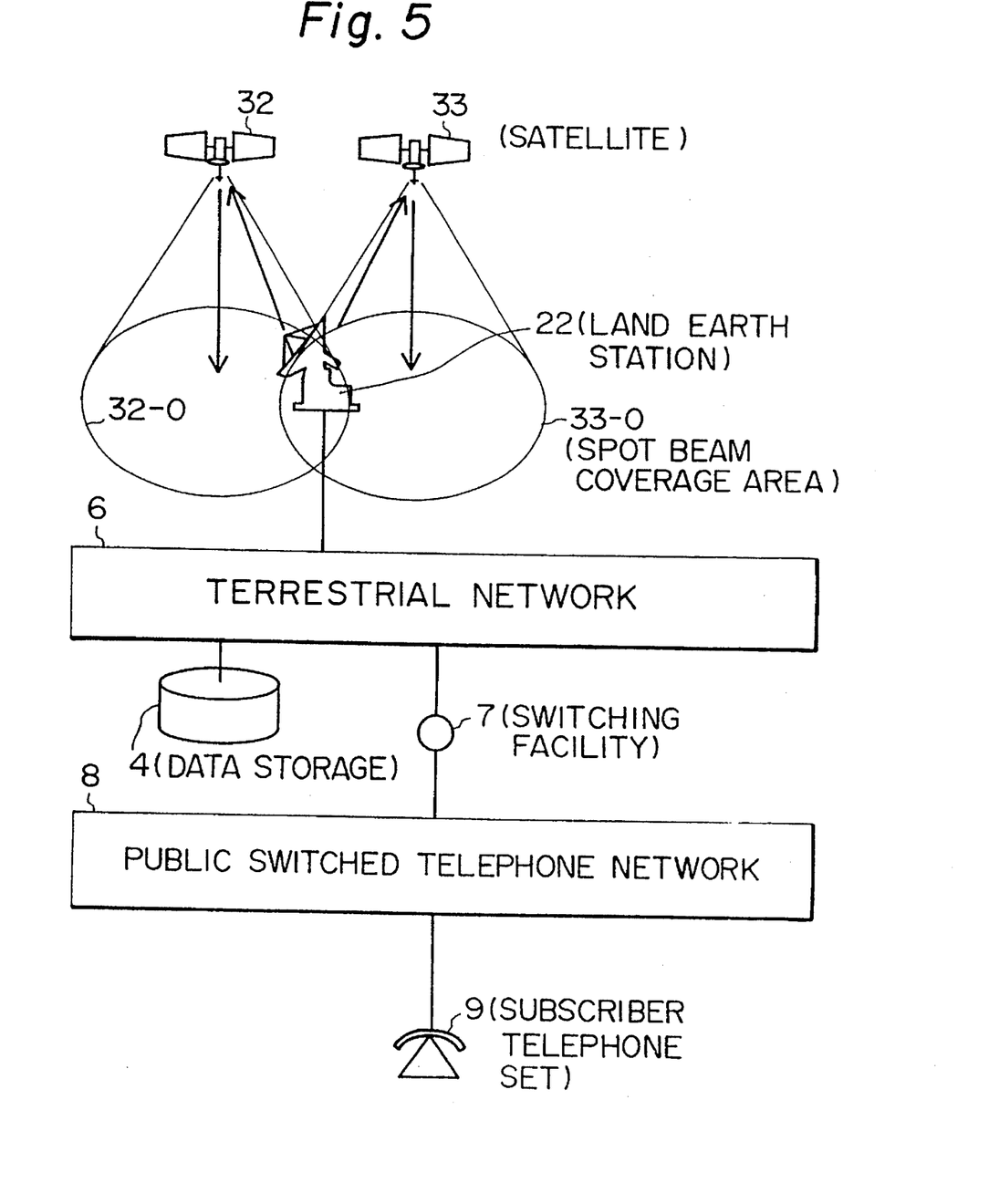
FIG. 5 is a diagram explanatory of how mobile terminal is called in a case where its location has been registered using identification information of a land earth station.

Turning now to FIGS. 4 and 5, a second embodiment of the present invention will be described.

This embodiment has a construction in which a land earth station or a mobile terminal at any place on the earth, which is covered by the earth orbiting satellite communication system, is allowed to communicate with at least one satellite at all times. Each land earth station always transmits its identification code via all satellites with which it is allowed to communicate.

FIG. 4 conceptually illustrates the location determining and registering system according to the present invention. In FIG. 4, reference numerals 30-0, 31-0 and 32-0 denote areas wherein mobile terminal is capable of communicating with non-geosynchronous satellites 30, 31 and 32, respectively. The land earth stations 20 and 21 transmit their identification codes LID20 and LID21 via the satellites 30, 31 and 32. When the mobile terminal, the satellites and the land earth stations assume such positions as depicted in FIG. 4, the mobile terminal 1 receives the identification code LID20 of the land earth station 20 via the satellite 31. Now, let it be assumed that the mobile terminal 1 has come to receive the identification code LID20 of the land earth station 20 as a result of its movement. In this instance, if the identification code LID20 is different from that received until then, the mobile terminal 1 transmits the identification code LID20 together with its terminal identification code TID1 via the satellite 30. Conversely, when the land earth station identifying code LID20 is the same as that received until then, the mobile terminal 1 does not transmit it. The terrestrial network 6 registers, as the latest location of the mobile terminal 1, in the data storage 4 the identification code LID20 transmitted from the mobile terminal 1.

A call can be connected to the thus registered mobile terminal 1 simply by using the land earth station 20 corresponding to the identification code LID20 registered for the mobile terminal 1. FIG. 5 conceptually shows how a call from a subscriber telephone set is connected to the mobile terminal 1. In FIG. 5, reference numerals 32-0 and 33-0 denote areas wherein mobile terminal is allowed to communicate with non-geosynchronous satellites 32 and 33, respectively. Whenever a call for the mobile terminal 1 is originated, the data storage 4 is referred to, because the latest location information of the mobile terminal 1 has been registered therein. Since the data storage 4 has registered therein the identification code LID20 of the land earth station 20 as the latest location information of the mobile 1, the land earth station 20 transmits a call announcement message to the mobile terminal 1 via the satellites 32 and 33.

Embodiment 3

Figure 6:
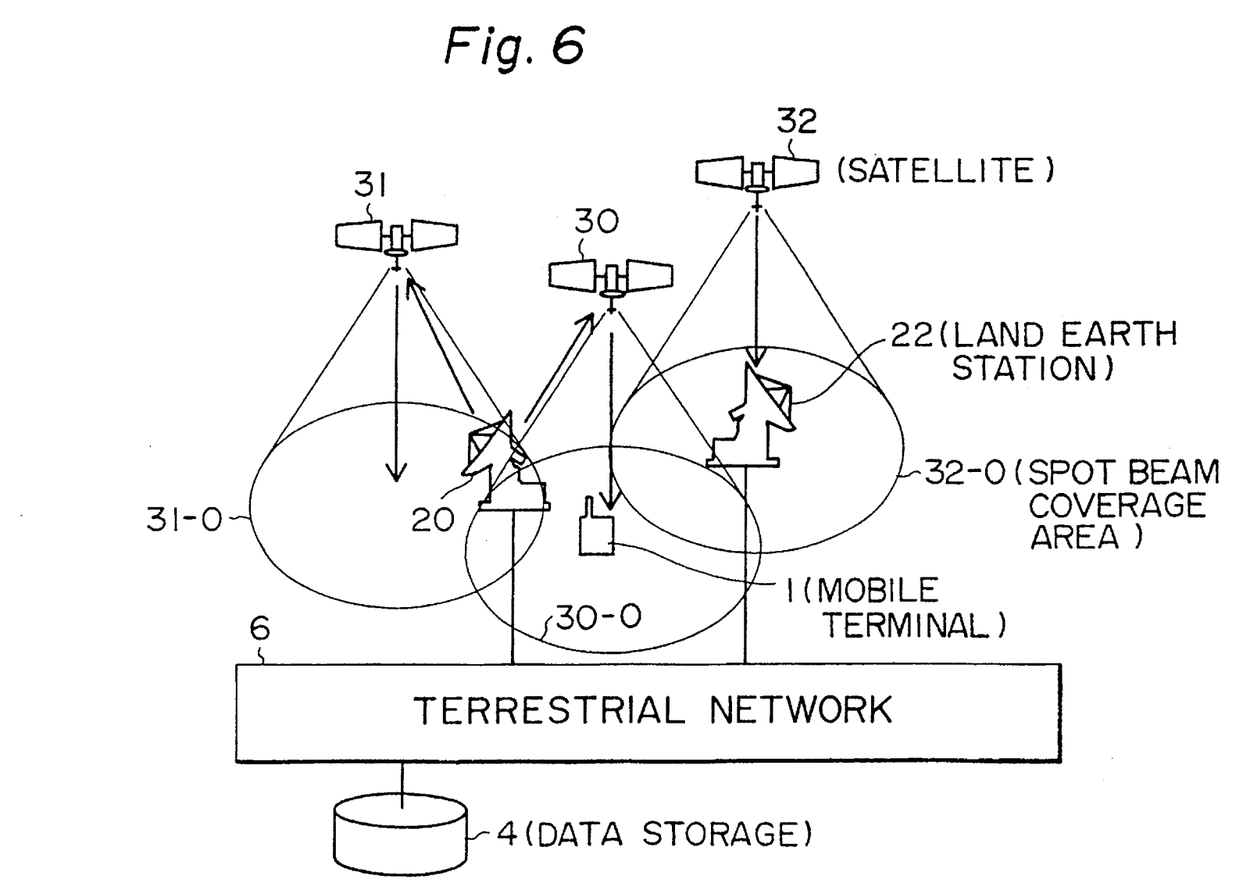
FIG. 6 is a diagram explanatory of how the location of mobile terminal is registered using identification information of a land earth station.
Figure 7:
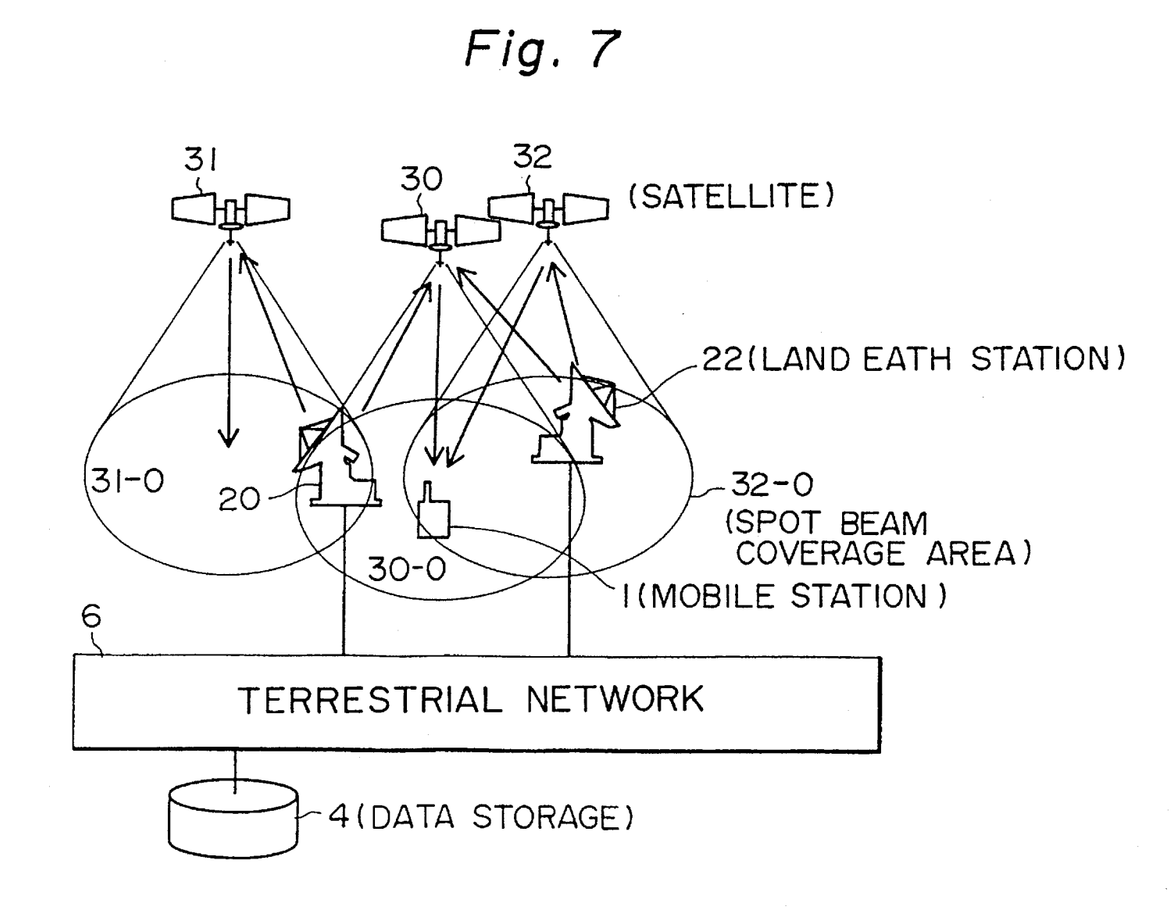
FIG. 7 is a diagram explanatory of how the location of mobile terminal is registered using identification information of a land earth station.

FIGS. 6 and 7 conceptually illustrate a third embodiment of the present invention. Reference numeral 22 denotes a land earth station.

According to the location determining and registering system described previously with reference to Embodiment 2, when a mobile terminal, land earth stations and non-geosynchronous satellite assume such positions as shown in FIG. 6 relative to one another, the mobile terminal 1 receives the identification code of the land earth station 20, and hence the identification code LID20 corresponding to the land earth station 20 is registered as the latest location information of the mobile terminal 1 in the data storage 4. When the mobile terminal, the land earth stations and the satellites change their positions relative to one another as shown in FIG. 7 as the satellite go around the earth, the mobile terminal 1 comes to receive the identification code LID22 of the land earth station 22 as well as the identification code LID20 of the land earth station 20 received until then. The mobile terminal 1 transmits via the satellites information on the effect that it has come to receive the identification code of the land earth station 22 as well. That is, the mobile terminal 1 transmits the land earth station identifying codes LID20 and LID22 together with its terminal identification code TID1. The terrestrial network receives them and registers the land station identifying numbers LID20 and LID22 as the latest location information of the mobile terminal 1 in the data storage 4.

Figure 8:
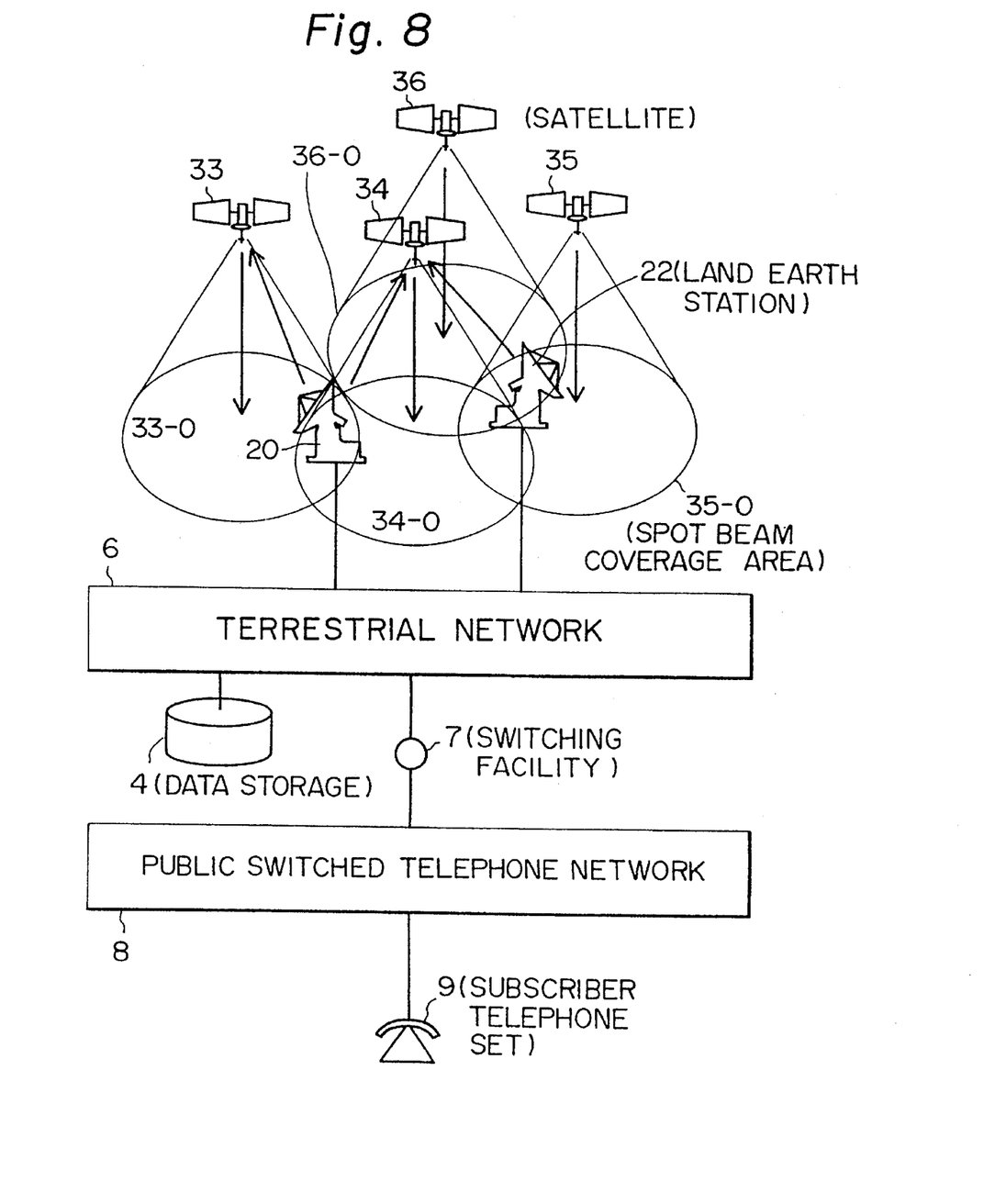
FIG. 8 is a diagram explanatory of how mobile terminal is called in the case where its location has been registered using identification information of a land earth station.

Thereafter, a call can be connected to the mobile terminal 1 simply through the use of the registered land earth stations 20 and 22. FIG. 8 conceptually shows how a call from a subscriber telephone set is connected to the mobile terminal 1. in FIG. 8, reference numerals 34 through 36 denote non-geosynchronous satellites and 43-0 through 46-0 areas wherein a mobile terminal is allowed to communicate with the satellites 34 through 36, respectively. The latest location information of the mobile terminal 1 has been registered in the data storage 4, and hence is referred to for sending a call announcement message to the mobile terminal 1. In the data storage 4, the land station identifying numbers LID20 and LID22 are registered, as the positional information of the mobile terminal 1, the identification codes LID20 and LID22 of the land earth stations 20 and 22. Accordingly, the land earth station 20 sends a call announcement message to the mobile terminal 1 via the satellites 33 and 34 with which the land station 20 is allowed to communicate, and the land earth station 22 sends a call announcement message via the satellites 35 and 36 with which it is allowed to communicate.
Embodiment 4

FIG. 7 conceptually illustrates a fourth embodiment of the present invention. According to the location determining and registering system of the Embodiment 2, the mobile terminal 1 receives the identification codes LID20 and LID22 of the land earth stations 20 and 22 in such a case as shown in FIG. 7. Where the land earth station 20 has been registered as the latest location information of the mobile terminal 1, the mobile terminal 1 does not transmit either of the identification codes of the land earth stations 20 and 22 it received. Hence, the land earth station 20 registered as the latest location information of the mobile terminal 1 in the data storage 4 remains unchanged.
Embodiment 5

A fifth embodiment of the present invention will be described with reference to FIG. 7.

This embodiment has a construction which allows mobile terminal at any place on the earth to communicate with at least one satellite at all times. Each land station transmits its identification code via all satellites with which it is capable of communicating. The mobile terminal is so designed as to transmit all of its received land station identifying codes to the terrestrial network.

FIG. 7 conceptually shows this embodiment. In such a state as shown, the mobile terminal 1 receives the identification codes LID20 and LID22 of the land earth stations 20 and 22 and transmits them together with its terminal identification code TID1 via the non-geosynchronous satellites to the terrestrial network 6. Supposing that it has be pre-registered in the data storage 4 that the mobile terminal 1 would receive service mainly through the land earth station 20, the terrestrial network selects the land earth station identifying code LID20 received from the mobile terminal 1 and registers it as the latest location information of the mobile terminal 1.

Thereafter, a call can be connected to the mobile terminal 1 using the registered land earth station 20. This is as shown in FIG. 5. In the case of FIG. 5, the call announcement message is transmitted via the satellites 32 and 33 with which the land earth station 20 is allowed to communicate, since the land earth station 20 has been registered as the latest location information of the mobile terminal 1.
Embodiment 6

A sixth embodiment of the present invention will be described with reference to FIG. 7.

This embodiment has a construction which allows mobile terminal at any place within the desired service area on the earth to communicate with at least one satellite at all times. Each land station always transmits its identification code via all satellites with which it is capable of communication.

FIG. 7 conceptually shows this embodiment. When the power of the mobile terminal 1 is turned on in such a state as shown in FIG. 7, the mobile terminal 1 receives the identification codes LID20 and LID22 of the land stations 20 and 22. Assuming that it has been pre-recorded in the mobile terminal 1 that it receives services mainly through the land earth station 20, the mobile terminal 1 selects the identification code LID20 of the land earth station 20 from the identification codes LID20 and LID22 it received and sends it together with its terminal identification code TID1 via non-geosynchrous satellites to the terrestrial network 6. The land earth station identifying code LID20 transmitted from the mobile terminal 1 is registered as the latest location of the mobile terminal 1 in the data storage 4.

Thereafter, a call can be connected to the mobile terminal 1 using the registered land earth station 20, as conceptually shown in FIG. 5. In the case of FIG. 5, the call announcement message to the mobile terminal 1 is transmitted via the satellites 32 and 33 with which the land earth station 20 is allowed to communicate, since the land earth station 20 has been registered as the latest positional information of the mobile terminal 1.

As described above in detail, according to the present invention, the latest location information of mobile terminal is registered in the data storage provided in the land network and a call can be connected to the mobile terminal by sending call announcement messages to a limited small area by properly selecting the land earth stations, the satellites and the spot beams on the basis of the latest location information registered in the data storage. This leads also to reduction of the number of circuits necessary for sending call announcement messages.

What we claim is:

1. A system for determining and registering locations of mobile terminals for a communication system with non-geosynchronous satellites and a terrestrial network wherein:

said non-geosynchronous satellites are disposed and the terrestrial network on the earth has a plurality of land earth stations so that each of said mobile terminals in a selected service area on the earth is allowed to communicate with at least one of said land earth stations via at least one of said satellites;

each of said non-geosynchronous satellites irradiates at least one corresponding spot beam to each of smaller areas into which a coverage area of the system is divided, whereby each of said satellites selectively communicates with said mobile terminals in said coverage area through said at least one corresponding spot beam;

identification information on any of said land earth stations, of said non-geosynchronous satellites and of each spot beam irradiated to communicate with a corresponding one of said non-geosynchronous satellites is transmitted through said each spot beam irradiated from a corresponding one of said non-geosynchronous satellites; and each of said mobile terminals in said selected area effectively registers information on its location in said terrestrial network using said identification information received via said non-geosynchronous satellites.

2. A system for determining and registering locations of mobile terminals for a communication system with non-geosynchronous satellites and a terrestrial network wherein:

said non-geosynchronous satellites are disposed and the terrestrial network on the earth has a plurality of land earth stations so that each of said mobile terminals in a selected service area on the earth is allowed to communicate with at least one of said land earth stations via at least one of said satellites;

each of said non-geosynchronous satellites irradiates at least one corresponding spot beam to each of smaller areas into which a coverage area of the system is divided, whereby each of said satellites selectively communications with said mobile terminals in said coverage area through said at least one corresponding spot beam;

and wherein:

identification information on one of said satellites and on said spot beam is transmitted through a corresponding spot beam of a corresponding one of said non-geosynchronous satellites;

each of said mobile terminals in said selected service area receives said identification information transmitted;

each of said mobile terminals transmits via one of said non-geosynchronous satellites said received identification information on said satellites and said corresponding spot beam and time information on the time when it receives said identification information;

at least one of said land earth stations receives said identification information and said time information transmitted from a corresponding one mobile terminal;

said terrestrial network calculates an area where said corresponding one mobile terminal is assumed to exist at the time when said corresponding one mobile terminal transmits said identification information, on the basis of the area of the earth to which the spot beam of the satellite corresponding to said identification information was irradiated; and said calculated area is registered as a location of said mobile terminal.

3. A mobile terminal location determining and registering system according to claim 1, wherein:

each of said land earth stations transmits its corresponding identification information via all of said non-geosynchronous satellites with which it is allowed to communicate;

each of said mobile terminals in said selected service area receives said transmitted identification information on said land earth stations;

said each mobile terminal transmits said received identification information on said land earth stations via said non-geosynchronous satellites;

at least one of said land earth stations receives said identification information on said land earth stations transmitted from said each mobile terminal; and said identification information on said land earth stations received by said mobile terminal is registered as location information of said each mobile terminal.

4. A mobile terminal location determining and registering according to claim 3, wherein when said each mobile terminal receives identification information on said land earth stations:

said each mobile terminal transmits said identification information on said land earth stations via said non-geosynchronous satellites; and said identification information on said land earth stations received by said each mobile terminal and transmitted therefrom is registered as location information of said each mobile terminal.

5. A system for determining and registering locations of mobile terminals for a communication system with non-geosynchronous satellites and a terrestrial network wherein:

said non-geosynchronous satellites are disposed and the terrestrial network on the earth has a plurality of land earth stations so that each of said mobile terminals in a selected service area on the earth is allowed to communicate with at least one of said land earth stations via at least one of said satellites;

each of said non-geosynchronous satellites irradiates at least one spot beam to each of smaller areas into which a coverage area of the system is divided, whereby each of said satellites selectively communicates with said mobile terminals in said coverage area through said at least one spot beam;

identification information on any of said land earth stations, of said non-geosynchronous satellites and of each spot beam irradiated to communicate with a corresponding one of said non-geosynchronous satellites is transmitted through said each spot beam irradiated from a corresponding one of said non-geosynchronous satellites;

each of said mobile terminals in said selected area effectively registers information on its location in said terrestrial network using said identification information received via said non-geosynchronous satellites;

each of said land earth stations transmits its corresponding identification information via all of said non-geosynchronous satellites with which it is allowed to communicate;

each of said mobile terminals in said selected service area receives said transmitted identification information on said land earth stations;

said each mobile terminal transmits said received identificational information on said land earth stations via said non-geosynchronous satellites;

at least one of said land earth stations receives said identification information on said land earth stations transmitted from said each mobile terminal;

said identification information on said land earth stations received by said mobile terminal is registered as location information of said each mobile terminal;

and wherein:

when said each mobile terminal receives said identification information on said land earth stations;

said each mobile terminal transmits said received identification information on said land earth stations via said non-geosynchronous satellites; and said terrestrial network selects a part of said identification information on said land earth stations received by and transmitted from said mobile terminal so that said identification information on said land earth stations selected by said terrestrial network is registered as location information of said each mobile terminal.

6. A system for determining and registering locations of mobile terminals for a communication system with non-geosynchronous satellites and a terrestrial network wherein:

said non-geosynchronous satellites are disposed and the terrestrial network on the earth has a plurality of land earth stations so that each of said mobile terminals in a selected service area on the earth is allowed to communicate with at least one of said land earth stations via at least one of said satellites;

each of said non-geosynchronous satellites irradiates at least one spot beam to each of smaller areas into which a coverage area of the system is divided, whereby each of said satellites selectively communicates with said mobile terminals in said coverage area through said at least one spot beam;

identification information on any of said land earth stations, of said non-geosynchronous satellites and of each spot beam irradiated to communicate with corresponding one of said non-geosynchronous satellites is transmitted through said each spot beam irradiated from a corresponding one of said non-geosynchronous satellites;

each of said mobile terminals in said selected area effectively registers information on its location in said terrestrial network using said identification information received via said non-geosynchronous satellites;

each of said land earth stations transmits its corresponding identification information via all of said non-geosynchronous satellites with which it is allowed to communicate;

each of said mobile terminals in said selected service area receives said transmitted identification information on said land earth stations;

said each mobile terminal transmits said received identification information on said land earth stations via said non-geosynchronous satellites;

at least one of said land earth stations receives said identification information on said land earth stations transmitted from said each mobile terminal;

said identification information on said each land earth stations received by said mobile terminal is registered as location information of said each mobile terminal;

and wherein:

when said each mobile terminal receives said identification information on said land earth stations;

said each mobile terminal selects a part of said received identification information on said land earth stations;

said each mobile terminal transmits said selected identification information on said land earth stations via said non-geosynchronous satellites; and said identification information on said land earth stations received by, selected by and transmitted from said mobile terminal is registered as location information of said each mobile terminal.

7. A system for determining and registering locations of mobile terminals for a communication system with non-geosynchronous satellites and a terrestrial network wherein:

said non-geosynchronous satellites are disposed and the terrestrial network on the earth has a plurality of land earth stations so that each of said mobile terminals in a selected service area on the earth is allowed to communicate with at least one of said land earth stations via at least one of said satellites;

each of said non-geosynchronous satellites irradiates at least one spot beam to each of smaller areas into which a coverage area of the system is divided, whereby each of said satellites selectively communicates with said mobile terminals in said coverage area through said at least one spot beam;

identification information on any of said land earth stations, of said non-geosynchronous satellites and of each spot beam irradiated to communicate with a corresponding one of said non-geosynchronous satellites is transmitted through said each spot beam irradiated from a corresponding one of said non-geosynchronous satellites;

each of said mobile terminals in said selected area effectively registers information on its location in said terrestrial network using said identification information received via said non-geosynchronous satellites;

each of said land earth stations transmits its corresponding identification information via all of said non-geosynchronous satellites with which it is allowed to communicate;

each of said mobile terminals in said selected service area receives said transmitted identification information on said land earth stations;

said each mobile terminal transmits said received identification information on said land earth stations transmitted from said each mobile terminal;

said identification information on said land earth stations received by said mobile terminal is registered as location information of said each mobile terminal;

and wherein:

said each mobile terminal receives at least a part of said identification information on said land earth stations, and when said received identification information land earth stations contains said identifying information on said land earth stations already transmitted from said each one mobile terminal, said each mobile terminal does not transmit said received identifying information on said land earth station.

* * * * *